US011922188B2

(12) United States Patent
Smith et al.

(10) Patent No.: US 11,922,188 B2
(45) Date of Patent: *Mar. 5, 2024

(54) INTELLIGENT HOME SCREEN OF CLOUD-BASED CONTENT MANAGEMENT PLATFORM

(71) Applicant: Google LLC, Mountain View, CA (US)

(72) Inventors: Joshua Smith, Boulder, CO (US);
Michael Colagrosso, Arvada, CO (US);
Michael Procopio, Boulder, CO (US);
Sandor Dornbush, Boulder, CO (US);
Sean Whipps, Boulder, CO (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/745,834

(22) Filed: May 16, 2022

(65) Prior Publication Data
US 2022/0276881 A1    Sep. 1, 2022

Related U.S. Application Data

(63) Continuation of application No. 17/262,165, filed as application No. PCT/US2018/047360 on Aug. 21, 2018, now Pat. No. 11,334,375.
(Continued)

(51) Int. Cl.
*G06F 9/451* (2018.01)
*G06F 3/04812* (2022.01)
(Continued)

(52) U.S. Cl.
CPC .......... *G06F 9/451* (2018.02); *G06F 3/04812* (2013.01); *G06F 3/0482* (2013.01);
(Continued)

(58) Field of Classification Search
None
See application file for complete search history.

(56) References Cited

U.S. PATENT DOCUMENTS 8,429,540 B1    4/2013  Yankovich et al.
8,892,679 B1   11/2014  Destagnol et al.
(Continued)

OTHER PUBLICATIONS

Sandeep Tata et al: "Quick Access : Building a Smart Experience for Google Drive", Knowledge Discovery and Data Mining, Jan. 1, 2017, pp. 1643-1651, XP055574733, 2 Penn Plaza, Suite 701 New York NY 10121-0701 USA.
(Continued)

*Primary Examiner* — Justin S Lee
(74) *Attorney, Agent, or Firm* — Lowenstein Sandler LLP

(57) ABSTRACT

A method of providing a workspace graphical user interface (GUI) for a user of a cloud-based content management platform includes providing the workspace GUI for the user via the cloud-based content management platform. The workspace GUI presents visual representations of documents stored on the user's cloud storage of the cloud-based content management platform and visual representations of workspaces created by the user. Each workspace includes a set of documents previously added to a respective workspace by the user and stored on the user's cloud storage. The method further includes receiving, via the workspace GUI, a user input with respect to a corresponding document stored on the user's cloud storage. The user input indicates a request to add the corresponding document to a particular workspace. The method further includes modifying a visual representation of the particular workspace to add the corresponding document to the particular workspace, and allowing the user to perform an action pertaining to content of the corresponding document in the workspace GUI without
(Continued)

opening a document editing application associated with the corresponding document.

23 Claims, 8 Drawing Sheets

Related U.S. Application Data

(60) Provisional application No. 62/702,258, filed on Jul. 23, 2018.

(51) Int. Cl.
*G06F 3/0482* (2013.01)
*G06F 3/0484* (2022.01)
*G06F 11/34* (2006.01)
*G06F 16/93* (2019.01)

(52) U.S. Cl.
CPC ........ *G06F 3/0484* (2013.01); *G06F 11/3438* (2013.01); *G06F 16/93* (2019.01)

(56) References Cited

U.S. PATENT DOCUMENTS

| | | | |
|---|---|---|---|
| 9,152,299 B2* | 10/2015 | McCann | G06F 3/0482 |
| 2009/0298546 A1 | 12/2009 | Kim et al. | |
| 2012/0054639 A1 | 3/2012 | Shi et al. | |
| 2013/0254699 A1 | 9/2013 | Bashir et al. | |
| 2015/0082196 A1 | 3/2015 | Berger et al. | |
| 2015/0200945 A1 | 7/2015 | Edson | |
| 2016/0026348 A1* | 1/2016 | Garcia | H04L 67/1095 715/738 |
| 2016/0162442 A1* | 6/2016 | Esgar | H04L 67/125 715/249 |
| 2016/0162458 A1* | 6/2016 | Munro | G06F 16/93 715/230 |
| 2016/0188147 A1* | 6/2016 | DeCrescenzo | H04L 63/20 715/738 |
| 2016/0224548 A1* | 8/2016 | Massand | G06F 16/93 |
| 2016/0285795 A1 | 9/2016 | Beausoleil et al. | |
| 2016/0291856 A1 | 10/2016 | von Muhlen et al. | |
| 2016/0371241 A1* | 12/2016 | Wong | G06F 9/445 |
| 2017/0200122 A1 | 7/2017 | Edson et al. | |
| 2018/0025450 A1 | 1/2018 | Cheung et al. | |
| 2018/0060982 A1 | 3/2018 | Milles et al. | |
| 2018/0068010 A1* | 3/2018 | Paterson | G06F 16/93 |
| 2018/0188901 A1 | 7/2018 | Shtuchkin et al. | |
| 2019/0163339 A1* | 5/2019 | Zhu | G06F 3/0486 |

OTHER PUBLICATIONS

PCT International Search Report and Written Opinion for International Application No. PCT/US2018/047360 dated Apr. 4, 2019, 16 pages.

* cited by examiner

INTELLIGENT HOME SCREEN OF CLOUD-BASED CONTENT MANAGEMENT PLATFORM

RELATED APPLICATIONS

This application is a continuation application of co-pending U.S. patent application Ser. No. 17/262,165, filed Jan. 21, 2021, which is a 371 application of International Application No. PCT/US2018/047360, filed Aug. 21, 2018, which claims the benefit of U.S. Provisional Patent Application No. 62/702,258, filed Jul. 23, 2018, each of which is incorporated herein by reference.

TECHNICAL FIELD

Aspects and implementations of the present disclosure relate to a cloud-based content management platform, and more specifically, to a home screen of the cloud-based content management platform.

BACKGROUND

A cloud-based content management platform provides a cloud storage for storing documents and editing applications (e.g. word processor, presentation, and spreadsheet applications) for collaborative editing of the documents. Accordingly, users of the cloud-based content management platform can collaborate over a network to create and store documents in the cloud storage and edit, comment upon, or share the documents. A user would first access documents associated with the user account via a home screen provided by the cloud-based content management platform. From the home screen, the user can locate one of the documents and access the located document. The cloud-based content management platform can additionally provide one or more applications such as an online calendar, an email, and a messenger application. Thus, the users can schedule meetings for a project and communicate with each other over emails or instant messages to facilitate online collaboration.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In some implementations, a system and method are disclosed for providing a home screen graphical user interface (GUI) for a user of a cloud-based content management platform. In an implementation, the home screen GUI for the user via the cloud-based content management platform is provided. The home screen GUI includes a first area providing visual representations of documents stored on the user's cloud storage of the cloud-based content management platform and a second area providing visual representations of workspaces created by the user. Each workspace including a set of documents previously added to a respective workspace by the user and stored on the user's cloud storage. A user input with respect to a visual representation of a document stored on the user's cloud storage to the user is received via the first area of the home screen GUI. The user input indicates a request to add the document to a particular workspace. A visual representation of the particular workspace in the second area is modified to add the document to the particular workspace.

The present disclosure provides a method of providing a home screen GUI for a user of a cloud-based content management platform. The method may comprise providing the home screen GUI for the user via the cloud-based content management platform, wherein the home screen GUI comprises: a first area providing visual representations of documents stored on the user's cloud storage of the cloud-based content management platform; and a second area providing visual representations of workspaces created by the user, each workspace including a set of documents previously added to a respective workspace by the user and stored on the user's cloud storage. The method may further comprise: receiving, via the first area of the home screen GUI, a user input with respect to a visual representation of a document stored on the user's cloud storage, the user input indicating a request to add the document to a particular workspace; and modifying a visual representation of the particular workspace in the second area to add the document to the particular workspace.

The method may further comprise: receiving, via the home screen GUI, a user input indicating selection of a document provided in a visual representation of a workspace; and causing the selected document to be opened by a relevant application via the cloud-based content management platform for presentation to the user. The method may further comprise: determining documents associated with the user of the cloud-based content management platform; for each document associated with the user, determining a level of engagement of the user with a respective document during a last predetermined time period based on at least one of a length of time the user has accessed the respective document or whether or not the user has edited, added a comment to, or shared the respective document; and determining a set of active documents including one or more documents that have the level of engagement exceeding a predetermined threshold level. Providing the home screen GUI for the user may further comprise: determining one or more new workspaces for suggestion to the user, each new workspace for suggestion including a set of documents identified from the set of active documents; providing a notification of the one or more new workspaces for suggestion on the home screen GUI for a user input indicating approval to create a workspace; and responsive to receiving, via the home screen GUI, the user input indicating approval to create a particular workspace from the one or more new workspaces for suggestion, adding a visual representation of the particular workspace to the second area. Determining the one or more new workspaces for suggestion to the user may comprise: grouping documents from the set of active documents into a plurality of candidate workspaces for suggestion based on similarity amongst the documents in at least one of topicality, attachment source, associated users, or timing and frequency of user access; ranking the plurality of candidate workspaces for suggestion based on at least one of a number of documents in a respective candidate workspace for suggestion, recency of the documents in a respective candidate workspace for suggestion, relatedness amongst the documents in a respective candidate workspace for suggestion, or recency and frequency of the user interaction with the documents in a respective candidate workspace for suggestion; and selecting the one or more new workspaces for suggestion from the plurality of candidate workspaces for suggestion based on the rankings.

Providing the home screen GUI for the user may comprise: determining one or more workspaces for archival from the workspaces created by the user; providing a notification of the one or more workspaces for archival on the home screen GUI for a user input indicating approval to archive a workspace; and responsive to receiving, via the home screen GUI, the user input indicating approval to archive a particular workspace for archival, removing a visual representation of the particular workspace for archival from the second area in the home screen GUI. Determining the one or more workspaces for archival may comprise: determining a set of candidate workspaces for archival including the workspaces created by the user but excluding any workspaces archived; and, for each workspace in the set of candidate workspaces for archival, determining a number of documents in a respective candidate workspace for archival that overlap with documents in the set of active documents, and identifying the respective candidate workspace for archival as the workspace for archival responsive to determining that the number of documents does not exceed a predetermined threshold.

The present disclosure also provides a system comprising a memory device and a processing device operatively coupled to the memory device, the processing device configured to: provide the home screen GUI for the user via the cloud-based content management platform, wherein the home screen GUI comprises a first area providing visual representations of documents stored on the user's cloud storage of the cloud-based content management platform, and a second area providing visual representations of workspaces created by the user, each workspace including a set of documents previously added to a respective workspace by the user and stored on the user's cloud storage; receive, via the first area of the home screen GUI, a user input with respect to a visual representation of a document stored on the user's cloud storage, the user input indicating a request to add the document to a particular workspace; and modify a visual representation of the particular workspace in the second area to add the document to the particular workspace.

The processing device may be further configured to: receive, via the home screen GUI, a user input indicating selection of a document provided in a visual representation of a workspace; and cause the selected document to be opened by a relevant application via the cloud-based content management platform for presentation to the user. The processing device may be further configured to: determine documents associated with the user of the cloud-based content management platform; for each document associated with the user, determine a level of engagement of the user with a respective document during a last predetermined time period based on at least one of a length of time the user has accessed the respective document or whether or not the user has edited, added a comment to, or shared the respective document; and determine a set of active documents including one or more documents that have the level of engagement exceeding a predetermined threshold level. To provide the home screen GUI for the user, the processing device may be further configured to: determine one or more new workspaces for suggestion to the user, each new workspace for suggestion including a set of documents identified from the set of active documents; provide a notification of the one or more new workspaces for suggestion on the home screen GUI for a user input indicating approval to create a workspace; and responsive to receiving, via the home screen GUI, the user input indicating approval to create a particular workspace from the one or more new workspaces for suggestion, add a visual representation of the particular workspace to the second area. To determine one or more new workspaces for suggestion to the user, the processing device may be further configured to: group documents from the set of active documents into a plurality of candidate workspaces for suggestion based on similarity amongst the documents in at least one of topicality, attachment source, associated users, or timing and frequency of user access; rank the plurality of candidate workspaces for suggestion based on at least one of a number of documents in a respective candidate workspace for suggestion, recency of the documents in a respective candidate workspace for suggestion, relatedness amongst the documents in a respective candidate workspace for suggestion, or recency and frequency of the user interaction with the documents in a respective candidate workspace for suggestion; and select the one or more new workspaces for suggestion from the plurality of candidate workspaces for suggestion based on the rankings. To provide the home screen GUI for the user, the processing device may be further configured to: determine one or more workspaces for archival from the workspaces created by the user; provide a notification of the one or more workspaces for archival on the home screen GUI for a user input indicating approval to archive a workspace; and responsive to receiving, via the home screen GUI, the user input indicating approval to archive a particular workspace for archival, remove a visual representation of the particular workspace for archival from the second area in the home screen GUI. To determine the one or more workspaces for archival, the processing device may be further configured to: determine a set of candidate workspaces for archival including the workspaces created by the user but excluding any workspaces archived; and, for each workspace in the set of candidate workspaces for archival, determine a number of documents in a respective candidate workspace for archival that overlap with documents in the set of active documents, and identify the respective candidate workspace for archival as the workspace for archival responsive to determining that the number of documents does not exceed a predetermined threshold.

The present disclosure also provides a transitory or non-transitory computer readable medium storing instructions that, when executed, cause a processing device to: provide the home screen GUI for the user via the cloud-based content management platform, wherein the home screen GUI comprises a first area providing visual representations of documents stored on the user's cloud storage of the cloud-based content management platform, and a second area providing visual representations of workspaces created by the user, each workspace including a set of documents previously added to a respective workspace by the user and stored on the user's cloud storage; receive, via the first area of the home screen GUI, a user input with respect to a visual representation of a document stored on the user's cloud storage, the user input indicating a request to add the document to a particular workspace; and modify a visual representation of the particular workspace in the second area to add the document to the particular workspace.

The instructions may further cause the processing device to: determine documents associated with the user of the cloud-based content management platform; for each document associated with the user, determine a level of engagement of the user with a respective document during a last predetermined time period based on at least one of a length of time the user has accessed the respective document or whether or not the user has edited, added a comment to, or shared the respective document; and determine a set of active documents including one or more documents that have the level of engagement exceeding a predetermined threshold level. To provide the home screen GUI for the user, the instructions may cause the processing device to: determine one or more new workspaces for suggestion to the user, each new workspace for suggestion including a set of documents identified from the set of active documents; provide a notification of the one or more new workspaces for suggestion on the home screen GUI for a user input indicating approval to create a workspace; and responsive to receiving, via the home screen GUI, the user input indicating approval to create a particular workspace from the one or more new workspaces for suggestion, add a visual representation of the particular workspace to the second area. To determine one or more new workspaces for suggestion to the user, the instructions may cause the processing device to: group documents from the set of active documents into a plurality of candidate workspaces for suggestion based on similarity amongst the documents in at least one of topicality, attachment source, associated users, or timing and frequency of user access; rank the plurality of candidate workspaces for suggestion based on at least one of a number of documents in a respective candidate workspace for suggestion, recency of the documents in a respective candidate workspace for suggestion, relatedness amongst the documents in a respective candidate workspace for suggestion, or recency and frequency of the user interaction with the documents in a respective candidate workspace for suggestion; and select the one or more new workspaces for suggestion from the plurality of candidate workspaces for suggestion based on the rankings. To provide the home screen GUI for the user, the instructions may cause the processing device to: determine one or more workspaces for archival from the workspaces created by the user; provide a notification of the one or more workspaces for archival on the home screen GUI for a user input indicating approval to archive a workspace; and responsive to receiving, via the home screen GUI, the user input indicating approval to archive a particular workspace for archival, remove a visual representation of the particular workspace for archival from the second area in the home screen GUI. To determine the one or more workspaces for archival, the instructions may cause the processing device to: determine a set of candidate workspaces for archival including the workspaces created by the user but excluding any workspaces archived; and, for each workspace in the set of candidate workspaces for archival, determine a number of documents in a respective candidate workspace for archival that overlap with documents in the set of active documents; and identify the respective candidate workspace for archival as the workspace for archival responsive to determining that the number of documents does not exceed a predetermined threshold.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
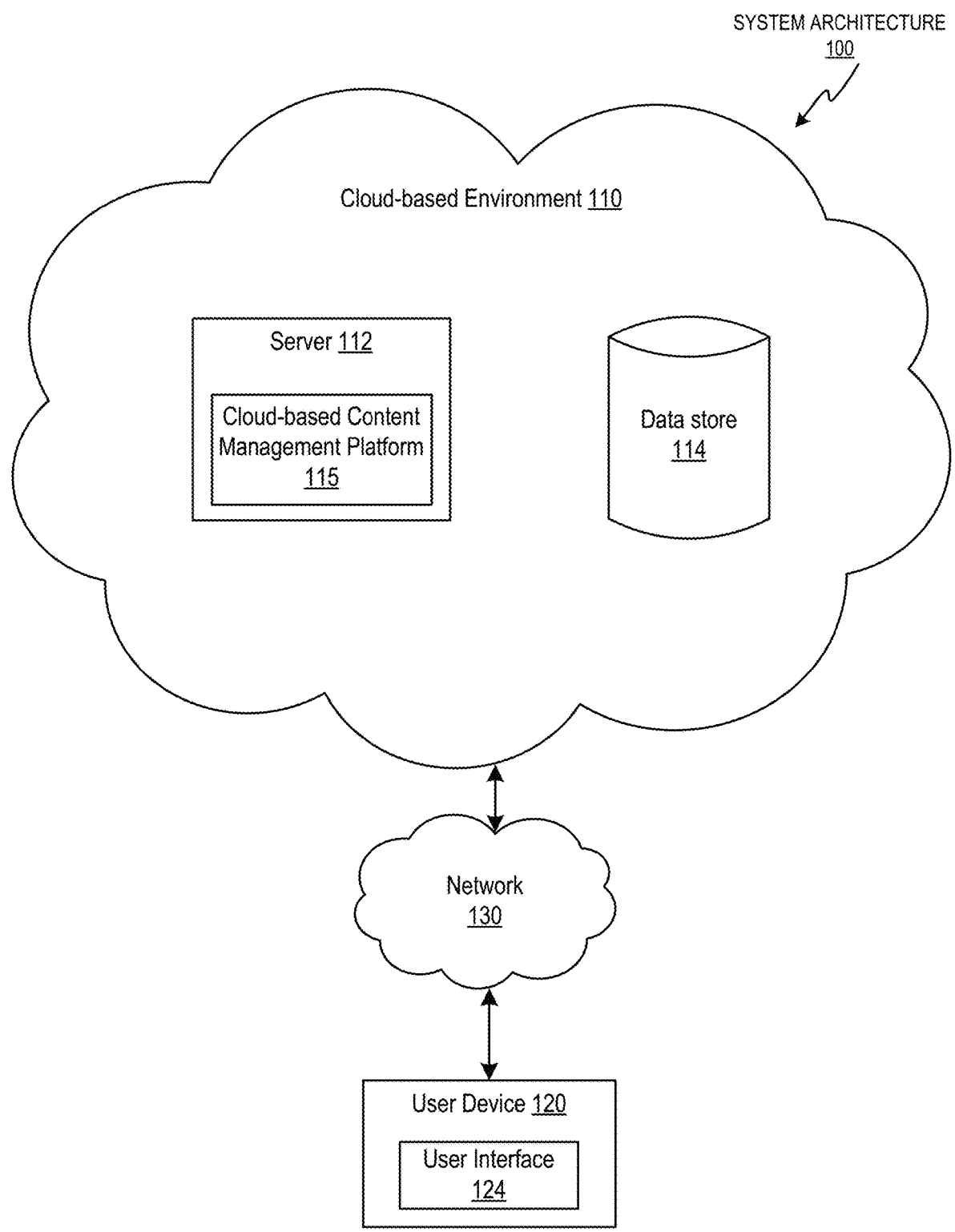
FIG. 1 illustrates an example of a system architecture for implementations of the present disclosure.

A cloud-based content management platform may provide a cloud storage for electronic documents, as well as editing applications such as a word processor, presentation, and spreadsheet applications, among other things. A user may log into the cloud-based content management platform, and be presented with a home screen graphical user interface of the cloud-based content management platform. A home screen graphical user interface (GUI) used herein refers to a GUI that lists documents associated with a user account that are stored in the cloud storage. A cloud storage used herein refers to a repository of online electronic documents associated with the user account. Such documents may include documents owned or created by the user and/or one or more groups the user is a member of, and/or documents shared with the user and/or one or more user groups. The user may select a document from the home screen GUI and access documents using an editing application provided by the cloud-based content management platform. To access a document as used herein refers to an opening, viewing, editing, or adding a comment to the document, among other things.

As more users collaborate via the cloud-based content management platform, a number of documents being stored in the cloud storage has exponentially grown. Accordingly, the user may need to spend a significant amount of time to locate and retrieve, from the home screen GUI of the cloud-based content management platform, a document in which the user is interested.

A technical problem which may be addressed by aspects and implementations of the present disclosure is that the continued growth in the number of documents accessible by the user via the cloud-based content management platform over a computer network has made the process of locating and retrieving a document more resource intensive. For example, locating a particular document in a cloud storage may involve a user manually reviewing a large corpus of documents until the desired document is found. This may result in an inefficient use of network resources and processing resources. For example, network resources may be consumed by transferring each document in the corpus from the cloud storage to a user device, whereupon processing resources may be consumed by opening each document at the user device to allow manual review by the user. This may be a particular problem in the case of a mobile user device with constrained network and/or processing resources.

A further technical problem is that the content of a document is not fixed but can change over time so that, even if the user is aware of the existence of a particular document, they cannot be sure what the document contains, and if the content of the document can be of interest to the user. Even if the user has previously accessed the document, they do not know whether the current content of the document is the same as the content when they last accessed the document. This means that a user may have to retrieve and access a document in order to see whether the content of the document has been modified since they last accessed it and whether the current content is still of interest to the user, and this again requires use of network and processing resources (which are wasted if, for example, there has been no significant change in the document since the user last accessed the document).

To address the above identified technical problems, aspects and implementations of the present disclosure may provide a home screen GUI of a cloud-based content management platform that includes a first area providing visual representations of documents stored on the user's cloud storage and a second area providing visual representations of workspaces created by the user. The visual representations in the first area may be dynamically updated and represent documents predicted to be of interest to the user, for example, because they have been frequently and recently accessed by the user. Accordingly, presenting the visual representations in the first area enables a continuous interaction between the user and the documents stored in the cloud storage via the cloud-based content management platform.

The visual representations in the second area may represent workspaces created by the user. A workspace used herein refers to a group or a cluster of documents stored on the cloud storage. A workspace may be implemented as a data object or a database table that is associated with documents. Alternatively, or additionally, the workspace may be implemented as a tag or metadata of documents. As such, a workspace is implemented separate from a folder hierarchy of documents. Thus, a creation or deletion of workspaces simply adds or removes the associations or tags without affecting a folder hierarchy of documents or document storage. A newly created workspace may be set to an active status as a default. An active workspace (i.e., a workspace having an active status) is a workspace intended to reflect a set of documents the user is actively working on and thus, always provided in the home screen GUI. The active workspace may be archived (i.e., the status of the active workspace may be changed to an archived status) in response to a user input. In this way, the user can remove visual representations of any unused workspaces from the home screen GUI. Further, the visual representations of workspaces (i.e., active workspaces) are provided to the second area in a stable manner (e.g., a position and/or content of an active workspace does not change unless per user request) and a restricted manner (e.g., archival or setting of a maximum number of visual representations.) Accordingly, the user can quickly and effectively locate documents the user is actively working on. This may significantly reduce the network resources and processing resources needed to locate and retrieve documents from a cloud storage. Furthermore, aspects and implementations of the present disclosure may provide a notification of a new workspace suggested and/or a workspace (i.e., an active workspace) to be archived, thereby facilitating an efficient use of the workspaces.

Therefore, aspects and implementations of the present disclosure reduce or save computing resources and network bandwidth required by a document search. Moreover, aspects and implementations of the present disclosure provide an improved system for managing documents stored on a cloud storage and interacting with a home screen GUI of a cloud-based content management platform for efficient management of the documents.

FIG. 1 illustrates an example of a system architecture 100 implementing some aspects of the present disclosure.

The system architecture 100 includes a cloud-based environment 110 connected to user device 120 via a network 130. The cloud-based environment 110 refers to a collection of physical machines that host applications providing one or more services (e.g., content management) to user device(s) 120 via a network 130. The network 130 may be public networks (e.g., the Internet), private networks (e.g., a local area network (LAN) or wide area network (WAN)), or a combination thereof. The network 130 may include a wireless infrastructure, which may be provided by one or more wireless communications systems, such as a wireless fidelity (WiFi) hotspot connected with the network 130 and/or a wireless carrier system that can be implemented using various data processing equipment, communication towers, etc. Additionally or alternatively, the network 130 may include a wired infrastructure (e.g., Ethernet).

The cloud-based environment 110 may include a server 112 and a data store 114. The data store 114 may be separate from the server 112 and communicatively coupled to the server 112, or the data store 114 may be part of the server 112. In some implementations, the data store 114 may be included as part of the user device 120. The data store 114 may store workspaces as a data object or in a database table. For each workspace, the data store 114 may store associated documents and a status of the workspace. The workspace as a default may be set to be in an active status and may be set to an archived status upon a request from the user. The data store 114 may store the status as a tag or a Boolean value associated with each workspace.

The data store 114 may include a cloud storage for each user. The data store 114 may store documents and metadata associated with documents stored in the cloud storage. Such metadata may include an access control list of users (e.g., who the creator or owner is, who can view and edit, who has been shared with the document), a key text, and events associated with the document. A key text used herein refers to a text that represents a topic of content of the document. An event used herein refers to a user activity incurred to access a document (e.g., an open event, view event, edit event, or a comment event). For each event, the data store 114 may store metadata associated with the event, such as a type of the event, creator of the event, content, and a timestamp.

The server 112 may be physical machines (e.g., server machines, desktop computers, etc.) that include one or more processing devices communicatively coupled to memory devices and input/output (I/O) devices. The server 112 may host a cloud-based content management platform 115 and may include one or more processing devices. In alternative implementations, the cloud-based content management platform 115 may be hosted by the user devices 120 (e.g., as standalone applications) and operate as peers in a peer-to-peer environment. In yet alternative implementations, applications on the user device 120 may interact with the cloud-based content management platform 115 and may perform some of the functionality of the content management platform 115. The cloud-based content management platform 115 may enable a user to access documents stored on the cloud storage via a home screen GUI shown as user interface 124.

In an implementation, the user interface 124 of the cloud-based content management platform 115 may be web pages rendered by a web browser and displayed on the user device 120 in a web browser window. In another implementation, the user interface 124 may be displayed by a mobile application or a desktop application. For example, the user interface 124 may be displayed by a native application executing on the user device 120. The native application may be separate from a web browser.

The user device 120 may include one or more processing devices communicatively coupled to memory devices and I/O devices. The user device 120 may be desktop computers, laptop computers, tablet computers, mobile phones (e.g., smartphones), or any suitable computing device. As discussed above, the user device 120 may each include a web browser and/or a client application (e.g., a mobile application or a desktop application). A user may view a home screen GUI via the web browser or the client application using the cloud-based content management platform 115. For example, once the user logs into the cloud-based content management platform 115, the user may be presented with the home screen GUI. As will be discussed in more detail below, the user may select a document in a visual representation of a workspace to access the document. The user may approve a creation of a workspace suggested by the cloud-based content management platform 115 and/or an archival or unarchival status for a workspace via the home screen GUI. As such, the user device 120 associated with the user may send a request to display the home screen GUI and transmit user input indicating selections. It should be noted that functions described in one implementation are performed by the cloud-based content management platform 115. In addition, the functionality attributed to a particular component can be performed by different or multiple components operating together.

Figure 2A:
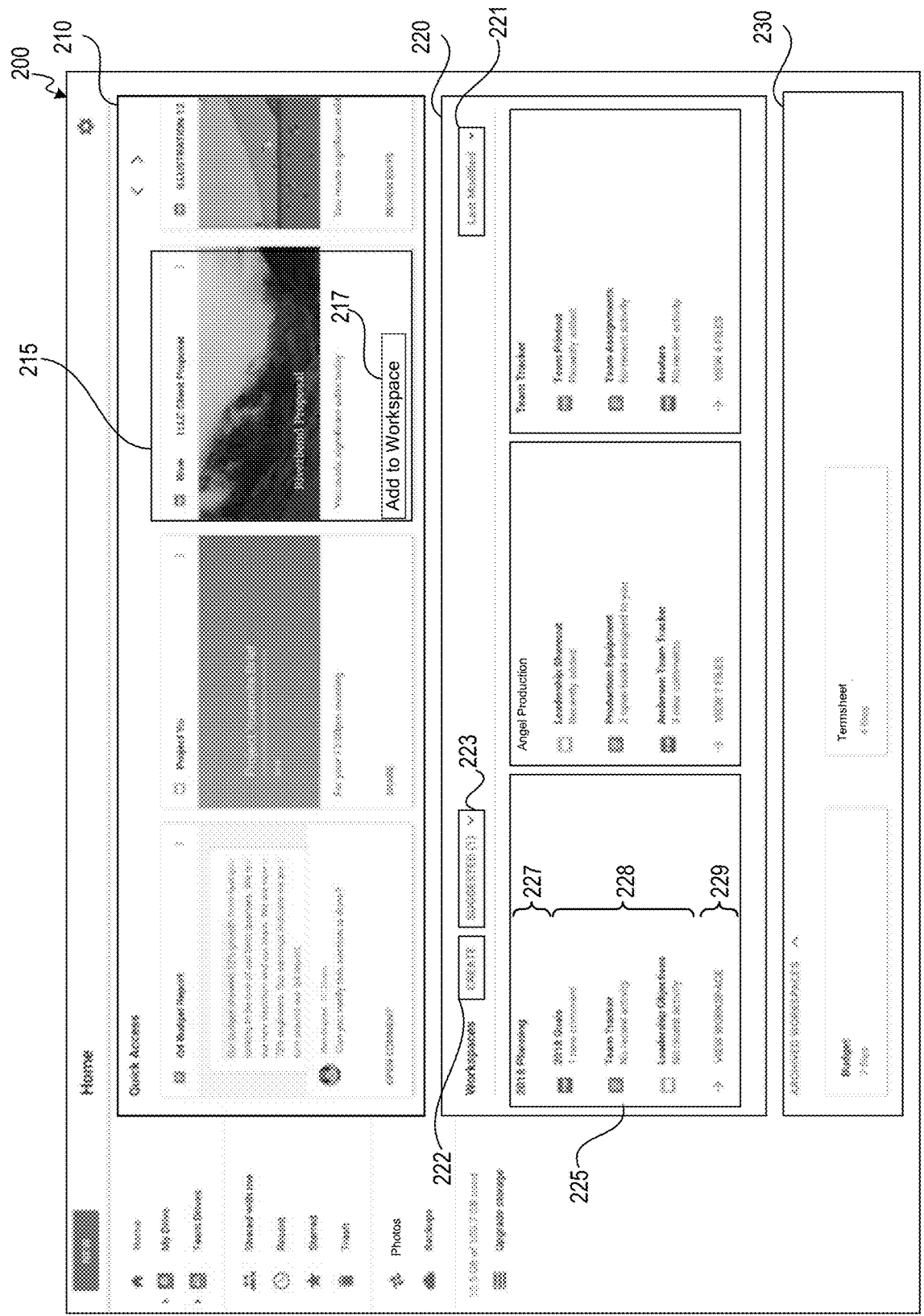
FIG. 2A illustrates an example user interface of a home screen GUI of a cloud-based content management platform for display on the user interface.

FIG. 2A illustrates an example user interface of a home screen GUI 200 of the cloud-based content management platform 115, in accordance with some aspects of the present disclosure. Home screen GUI 200 can be the same or part of the user interface 124. In some implementations, the home screen GUI 200 may be presented on the user device 120 in response to detecting a successful log into the cloud-based content management platform 115 by the user. In some other implementations, the home screen GUI 200 may be provided whenever a request for the home screen GUI 200 is received.

The home screen GUI 200 may include a first area 210 and a second area 220. The first area 210 may include visual representations of suggested documents 215. The suggested documents are stored on the cloud storage. In an implementation, the suggested documents may be predicted to be of interest to the user by the cloud-based content management platform 115. A visual representation of a document 215 may include a title and type of the corresponding document, a thumbnail representing the document, and a link or button allowing a particular user interaction with the corresponding document (e.g., to add the document to a workspace, open, preview, or share the document, open a comment in the document, or review edits suggested in the document.) The visual representation of a document 215 may be selected and drag-and-dropped to a visual representation of a workspace 225 by the user. In response to such user input, the cloud-based content management platform 115 may add the corresponding document to the respective workspace of the visual representation of a workspace 225. The user may also select an "Add to Workspace" link or button 217 on the visual representation of a document 215 to add the corresponding document to a workspace. In response to receiving the "Add to Workspace" selection, the cloud-based content management platform 115 may provide a GUI component on the home screen GUI 200 listing workspaces created by the user so that the user can choose which workspace to add the corresponding document to.

The second area 220 may include visual representations of workspaces 225, a sorting menu 221, a create workspace menu 222, and a notification tab for suggested workspaces 223. A visual representation of a workspace 225 may include a workspace title section 227, a workspace document section 228, and a workspace view section 229. In the workspace document section 228, a number of documents that can be listed may be limited and the listed documents may be sorted in any order. The user may select any document listed in the workspace document section 228. In response to receiving the selection of a document, the cloud-based content management platform 115 may open the document via a relevant application. The workspace view section 229 may provide a number of documents that are not listed in the workspace document section 228. In an implementation, the user may select the workspace view section 229, and in response, the cloud-based content management platform 115 may provide an entire list of documents associated with the corresponding workspace.

The sorting menu 221 may include an option to sort the visual representations of workspaces 225, for example, by an alphabetical order or an order of last modified date of a document that is associated with the workspaces. The create workspace menu 222 enables the user to create a workspace. Responsive to receiving a user input requesting to create a workspace, the cloud-based content management platform 115 may provide a notification of new workspaces for suggestion as described in details with respect to the FIG. 4A. The notification tab for suggested workspaces 223 may indicate a number of workspaces being suggested. The notification tab for suggested workspaces 223 may further provide an expandable submenu that may be expanded to show information about suggested workspaces (e.g., a suggested title and a list of documents associated with a suggested workspace.)

In some implementations, the home screen GUI 200 may further include a third area 230 for archived workspaces. The third area 230 may include visual representations of archived workspaces. In another implementation, the archived workspaces may be listed on a separate tab in the second area 220. The user may move (e.g., select and drag-and-drop) a visual representation of a workspace 225 from the second area 220 to the third area 230. Responsive to detecting the user input, the cloud-based content management platform 115 may archive the corresponding workspace and add a visual representation of the corresponding workspace to the third area 230. In another implementation, the user may move (e.g., select and drag-and-drop) a visual representation of an archived workspace to the second area. In response to the user input, the cloud-based content management platform 115 may unarchive the corresponding archived workspace and add the corresponding visual representation of the workspace to the second area 220. Implementations regarding archival and unarchival of workspaces are further described in relation to FIG. 5 below.

Figure 3:
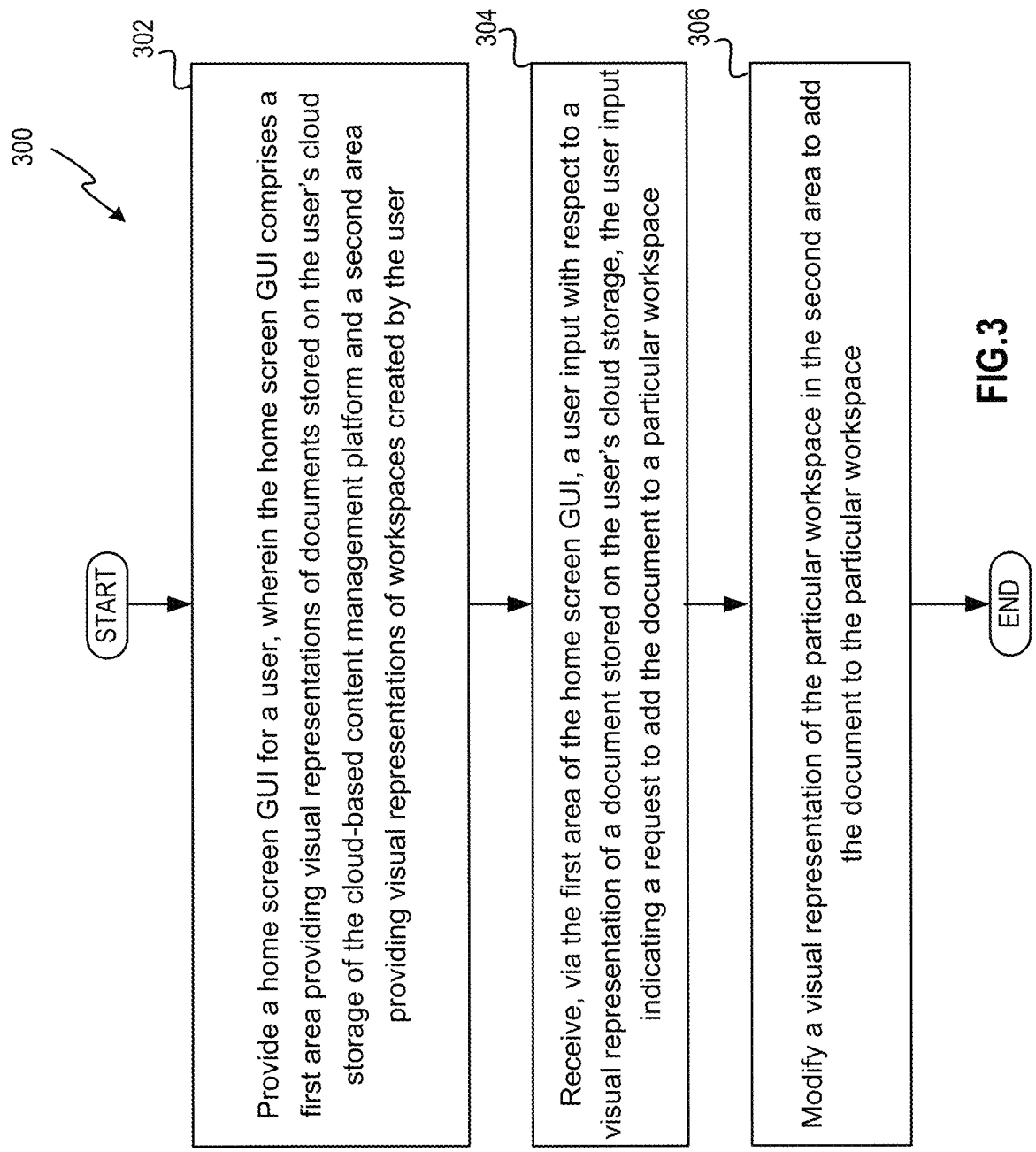
FIG. 3 illustrates a flow diagram of aspects of a method for providing the home screen GUI for a user of the cloud-based content management platform, in accordance with one implementation of the disclosure.

FIG. 3 illustrates a flow diagram of aspects of a method 300 for providing the home screen GUI for a user of the cloud-based content management platform, in accordance with one implementation of the disclosure.

The method 300 may be performed by the cloud-based content management platform 115 of FIG. 1. In another implementation, the method 300 may be performed by a client application provided by the cloud-based content management platform 115 and hosted by the user device 120. The method 300 may be carried out for each user of the cloud-based content management platform 115. Further, the method 300 may be performed when the user logs into the cloud-based content management platform 115 or at any other times the user requests the home screen GUI 200 of the cloud-based content management platform 115 to be provided on the user device 120.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

At block 302, the cloud-based content management platform 115 may provide the home screen GUI 200 for the user via the cloud-based content management platform 115 for display on the user device 120. As described in details above with respect to FIG. 2A, the home screen GUI 200 includes the first area 210 and second area 220. The first area 210 provides visual representations of documents 215 stored on the user's cloud storage of the cloud-based content management platform 115. Such documents may be documents to be of interest to the user as predicted by the cloud-based content management platform 115. The cloud-based content management platform 115 may predict documents to be of interest to the user. In an implementation, the cloud-based content management platform 115 may use a prediction scenario model to determine documents that the user should be notified about. The cloud-based content management platform 115 may adopt a heuristics approach or a machine learning approach to implement the prediction scenario model. In the machine learning approach, the cloud-based content management platform 115 may train the machine learning model.

A prediction scenario model may be a model for predicting a document or an event the user is likely to be interested in being notified about. An event used herein refers to a user activity incurred to access a document (e.g., an open event, edit event, view event, or comment event). Some examples of prediction scenario models include a prediction scenario model based on a routine, target or serendipitous document discovery, and/or comments. Each prediction scenario model may be tailored to a particular scenario. For example, the prediction scenario model based on the routine document discovery may be designed to predict a document under a scenario that a user routinely accesses documents via the cloud-based content management platform 115. In such case, the cloud-based content management platform 115 may obtain an output from the prediction scenario model based on the routine approach considering documents that are frequently and recently accessed by the user as having a higher probability of being of interest to the user than other documents that are less frequently and recently accessed by the user.

The prediction scenario model based on target or serendipitous discovery may operate under a scenario that the user is not aware of or has forgotten about documents (i.e., target or serendipitous documents) that may be helpful to the user because there are too many documents available via the cloud-based content management platform 115. Documents that may be helpful to the user may include documents that are related to documents the user has been currently working on, that collaborators' of the user have recently worked on, and that are popular among other users.

In addition, the prediction scenario model based on comments may operate under a scenario that the user interacts with comments from a particular comment thread (e.g., a comment thread the user is actively involved in (e.g., the comment thread the user created, or the user has contributed a reply), a comment thread where many users are involved in). Moreover, there may be a prediction scenario model for a scenario that the user responds to an email, chat, or calendar events which mention the user or are from other users the user frequently interacts with. Under such scenario, the prediction scenario model may rank a calendar event for a meeting with other users with whom the user frequently interacts higher than other calendar events open to various users of the cloud-based content management platform 115.

Figure 2B:
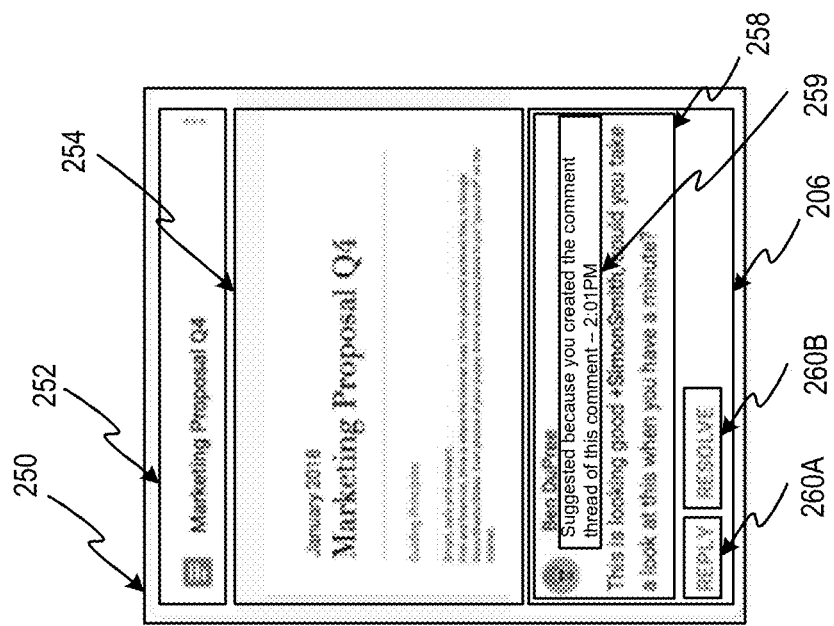
FIG. 2B depicts an example user interface of a card to notify the user of an electronic document.

The visual representations of documents 215 may be in a form of a card, list, or a table. For example, in FIG. 2B a card 250 for a predicted document, "Marketing Proposal Q4," is illustrated. The card 250 represents a document and an event associated with the document. The cloud-based content management platform 115 may build the card 250 to notify the user for suggestion of a document predicted to be of interest to the user from a prediction model. The card 250 may allow the user to quickly access the document of the card 250. In other implementations, the cloud-based content management platform 115 may compose the card 250 to notify the user as well as to enable the user to respond to the event represented by the card 250.

The card 250 includes a plurality of sections such as a document information section 252, document thumbnail section 254, and event section 258. The document information section 252 may include information about the document. For example, a title of the document, a type of the document (e.g., a word, spreadsheet, presentation slide), and an overflow menu option (e.g., a vertically oriented ellipse). Such document information may be presented as an icon or text. The cloud-based content management platform 115 may present more options when the user selects the overflow menu option, such as an option to share the document, add the document to favorites, locate the document in the cloud storage of the user, and remove the card 250. The document thumbnail section 254 may include a thumbnail image of a specific portion of the document. The cloud-based content management platform 115 may select a portion that is associated with the event of the card 250. For example, when the event is a comment event, the cloud-based content management platform 115 may take a snippet of a paragraph to where the comment event is added. In another implementation, the thumbnail may be an image of the first page of the document or a default image showing a type of the document and a title of the document without any reference to a portion of the document. In some implementations, the cloud-based content management platform 115 may open the document in response to the user's selection of the document thumbnail section 254.

The event section 258 may include details of the event. The cloud-based content management platform 115 may determine the most recent event or the most likely event the user would respond to (based on the user's response history) as the event to be described in the event section 258. In some implementations, the cloud-based content management platform 115 may add information (e.g., a name and profile picture) of other user(s) associated with the event, content of the event, and a reason text describing a reason for notifying the user of the event and/or the document. For example, in FIG. 2B, the event section 258 includes a profile picture and a name of "Ben DuPree" who created a comment event and the content of the comment event—"This is looking good +SimonSmith, could you take a look at this when you have a minute?." Under the name, "Ben DuPree," the event section 258 further includes a reason text ("Suggested because you created the comment thread of this comment") 209 along with a timestamp of the comment event.

The event section 258 may further include one or more intelligent buttons 260 (260A, 260B) to enable the user to quickly access the document or respond to the event being suggested to the user via the card 250. For example, if the event being notified to the user via the card 250 is a comment event, then the cloud-based content management platform 115 may select a reply intelligent button 260A and a resolve intelligent button 260B. The cloud-based content management platform 115 may enable the user to directly reply to the comment event within the card 250 without opening the document via the reply intelligent button 260A. In an implementation, in response to the cloud-based content management platform 115 detecting the user's selection of the reply intelligent button 260A, the cloud-based content management platform 115 may provide a text box inside the card 250 for the user to enter content of the reply and an add button to add the reply content to the respective comment thread.

In some implementations, the cloud-based content management platform 115 may update the home screen GUI 200 (including the visual representations of documents 215) on a periodic basis or whenever the home screen GUI 200 is provided to the user. Accordingly, the home screen GUI 200 may provide visual representations of a different set of documents in the first area 210 whenever the home screen GUI 200 is provided to the user.

The second area 220 provides visual representations of workspaces 225 created by the user. Each workspace includes a set of documents previously added to the respective workspace by the user. The documents are stored on the user's cloud storage. In contrast to the visual representations of documents 215, the visual representations of workspaces 225 may not be changed/updated in the home screen GUI 200. That is, the same visual representations of workspaces 225 may be provided in a stable manner every time the home screen GUI 200 is presented to the user, unless the user changes an order of the visual representations 225 or archive a workspace. In some implementations, the cloud-based content management platform 115 may set a maximum number of visual representations of workspaces 225 to be included in the second area 220.

When a visual representation of a workspace 225 is provided, the cloud-based content management platform 115 may first identify workspaces created by the user. In another implementation, if any workspaces have been archived, the archived workspaces may be excluded from the identified set of workspaces in the home screen GUI 200. The cloud-based content management platform 115 may determine whether a workspace is archived or not by identifying a tag, metadata, or property associated with each workspace. Implementations of a workspace archived are described in details below with respect to FIG. 5. Then, for each workspace identified, the cloud-based content management platform 115 may determine documents associated with the respective workspace and a visual representation of the respective workspace 225 may be provided graphically illustrating the documents as a group in a form of a card, list, or a table.

At block 304, the cloud-based content management platform 115 may receive a user input with respect to a visual representation of a document 215 stored on the user's cloud storage to the user via the first area 210 of the home screen GUI 200. The user input may indicate a request to add the document to a particular workspace. For example, the home screen GUI 200 may receive a selection of the visual representation of the document 215 and a drag-and-drop to the visual representation of the workspace 225. In another example, the home screen GUI 200 may receive a selection on a button or link with a text "Add to workspace" on the visual representation of the document 215. Then, the document of the selected visual representation 215 can be added to a list of workspaces. In an implementation, the cloud-based content management platform 115 may add a document to a workspace by associating the document with the workspace.

At block 306, a visual representation of the particular workspace 225 in the second area 220 may be modified to illustrate an addition of the document to the particular workspace. In an implementation, the newly added document may be included in the workspace document section 228 and an indication may be shown of a new document added to the workspace by marking or listing the newly added document as the first document in the workspace document section 228. The home screen GUI 200 may further indicate in the visual representation of the workspace 225 that the respective workspace has been updated. In addition to modifying the visual representation of the particular workspace, the cloud-based content management platform 115 may associate the document with the particular workspace to which it is added. For example, the cloud-based content management platform 115 may add a tag to the document, or modify the metadata of the document and/or the workspace, thereby to add the document to the workspace.

In some implementations, after the home screen GUI 200 is provided to the user, the cloud-based content management platform 115 may receive a user input indicating a selection (e.g., a double-click) of a document provided in a visual representation of a workspace 225. Accordingly, the home screen GUI 200 may cause the selected document to be opened by a relevant application via the cloud-based content management platform 115 for presentation to the user.

In the following implementations of the present disclosure illustrated in FIGS. 4 and 5, the cloud-based content management platform 115 may determine the set of active documents and provide suggestions for a new workspace or archival based on the set of active documents.

To determine the set of active documents, the cloud-based content management platform 115 may determine documents associated with the user. For each document, the cloud-based content management platform 115 may determine a level of engagement of the user with the respective document during a last predetermined time period. The cloud-based content management platform 115 may determine the level of engagement based on how much time the user spent on working on the document (e.g., a length of time the user has accessed the respective document), and/or whether the user is actively engaged in the document (e.g., whether or not the user has edited, added a comment to, and/or shared the respective document.) The cloud-based content management platform 115 may assign a higher level of engagement to documents the user has spent more time on. For example, if the user has spent 30% of the time while the user remained logged into the cloud-based content management platform 115 on a first document during the last two weeks and 2% of the time on a second document during the same period of time, the cloud-based content management platform 115 may assign a higher level of engagement (e.g., 0.3 for the time period criterion in the level of engagement) to the first document than that of the second document (e.g., 0.02 for the time period criterion in the level of engagement). Additionally, the cloud-based content management platform 115 may determine a different level of engagement based on the type of the user access (i.e., edit, comment, and share). For example, the cloud-based content management platform 115 may assign a different weight to each access type, such as 0.8 to editing, 0.5 to commenting, and 0.1 to sharing. Accordingly, the cloud-based content management platform 115 may determine a weighted sum of various access types per each document during the last two seeks to determine the level of engagement. The cloud-based content management platform 115 may identify documents that have the level of engagement exceeding a predetermined threshold level as the set of active documents. For example, the cloud-based content management platform 115 may initially set the threshold level to be 0.5. Then, the cloud-based content management platform 115 may identify any documents having the determined level of engagement above 0.5 as active documents. The cloud-based content management platform 115 may later evaluate its accuracy in determining the active documents by comparing the active documents against actual documents the user has accessed during the next predetermined time period (e.g., the next week). If there is more than a threshold percentage (e.g., 30%) discrepancy between the set of active documents determined by the cloud-based content management platform 115 and the set of documents the user actually has accessed, the cloud-based content management platform 115 may adjust values of weights in determining the level of engagement and/or the threshold level for the level of engagement to closely reflect a set of documents the user actually has accessed.

Figure 4A:
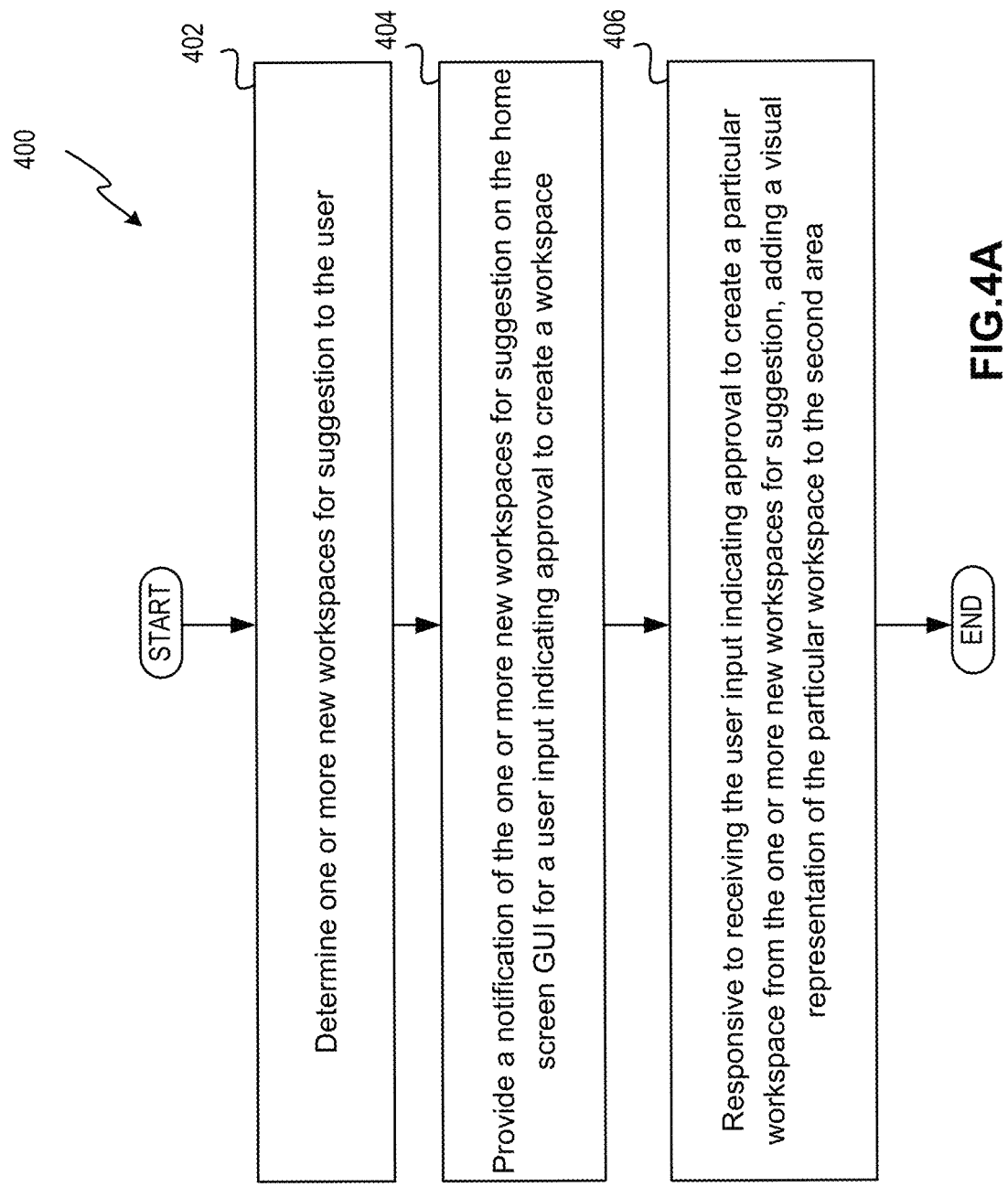
FIG. 4A depicts a flow diagram of aspects of a method for notifying the user of workspaces for suggestion, in accordance with one implementation of the disclosure.

FIG. 4A depicts a flow diagram of aspects of a method 400 for notifying the user of new workspaces for suggestion, in accordance with one implementation of the disclosure.

The method 400 may be performed by the cloud-based content management platform 115 of FIG. 1 to provide a notification on the user interface 124. In another implementation, the method 400 may be performed by a client application executed by one or more processing devices of the user device 120. In some implementations, the method 400 may be performed in response to receiving a request to create a new workspace (e.g., via the 222 in the home screen GUI 200). In some other implementations, the method 400 may be carried out when no workspace has been created. As such, the method 400 may be performed to introduce the user to the workspace functionality of the home screen GUI 200.

At block 402, the cloud-based content management platform 115 may determine new workspaces for suggestion of a new workspace to the user. Each new workspace for suggestion may include a set of documents identified from the set of active documents. In an implementation, the cloud-based content management platform 115 may group documents from the set of active documents into a plurality of candidate workspaces for suggestion. The cloud-based content management platform 115 may base the grouping or clustering based on similarity amongst the documents in topicality, attachment source, associated users, and/or timing and/or frequency of user access. In this way, the cloud-based content management platform 115 may suggest documents that a user is likely to group into a workspace. The cloud-based content management platform 115 may measure the similarity by a cosine distance, Euclidean distance, Manhattan distance, Minkowski distance, or any other statistical metrics.

In an implementation, the cloud-based content management platform 115 may group documents based on topicality. That is, the cloud-based content management platform 115 may identify documents from the set of active documents that share the same topic. The cloud-based content management platform 115 may determine topicality of a document based on a key text associated with the document. The key text may be indexed and represent a topic of content of the document. For example, the key text may be extracted from a title or it may be extracted from the content of the respective document based on the occurrence of particular text in the content of the respective document for at least a threshold number of times. The key text may be a word, phrase, or sentence. The key text may be manually entered by users associated with the document or automatically generated via the cloud-based content management platform 115. The cloud-based content management platform 115 may further extract knowledge graph entities of a knowledge graph that the documents are associated with. A knowledge graph refers to a system used to store complex structured or unstructured data that is used to enhance results of a search engine with semantic-search information gather from a wide variety of source (including documents stored in the cloud storage). The knowledge graph includes knowledge entities as nodes of a structure representing a topic with a definition. The cloud-based content management platform 115 may associate a knowledge graph entity with documents in the set of active documents using a key text, among other things. Furthermore, the cloud-based content management platform 115 may extract a salient term from documents in the set of active documents. A salient term is a term that is described as the most prominent or conspicuous among less prominent or conspicuous terms, and be visually indicated as such (e.g., bolded, quoted, all capitalized).

The cloud-based content management platform 115 may determine a predetermined number of most frequently appearing terms from the key texts, knowledge graph entities, and salient terms associated with the documents. The cloud-based content management platform 115 may determine a similarity measure (e.g., cosine similarity) of pairs or clusters of documents in the set of active documents based on the most frequently appearing terms. Then, the cloud-based content management platform 115 may use a clustering algorithm (e.g., hierarchical clustering) based on the similarity measure.

In another implementation, the cloud-based content management platform 115 may group documents based on an attachment source of each document in the set of active documents. Some examples of the attachment source are an email, a message in a chat room or a communication channel (e.g., a channel to send or post messages within a specific group of people), a calendar event, and a hyperlink within a document. In an implementation, the cloud-based content management platform 115 may create a candidate workspace out of documents attached in the same email threads or message threads in the same chat room or communication channel. The cloud-based content management platform 115 may further consider a sender of the document. For example, if the sender has been closely collaborated with the user or is likely to collaborate with the user in the near future (i.e., a collaborator), the cloud-based content management platform 115 may select documents from such sender from the email or message threads generate a candidate workspace. In another implementation, the cloud-based content management platform 115 may group documents attached to the same calendar event. The cloud-based content management platform 115 may also extract any hyperlinks to documents inside a document to identify, as a candidate workspace, documents that are hyperlinked as well as the document that includes the hyperlinks.

In another implementation, the cloud-based content management platform 115 may group documents based on associated users of the documents. The cloud-based content management platform 115 may determine affinity score (e.g., a score indicating how much of an interactive connection or collaboration exists between the user and each associated user. Then, the cloud-based content management platform 115 may use a predetermined threshold value to select a collaborator(s) from associated users having the affinity score above the predetermine threshold value to cluster documents from associated with the collaborator or documents the user has in common with the collaborator. In another implementation, the cloud-based content management platform 115 may further identify documents recently edited, commented or shared by the collaborator from the documents associated with the collaborator or documents the user has in common with the collaborator. The cloud-based content management platform 115 may group these documents by each collaborator. For example, if the user has been closely working with Ben Dupree, then the cloud-based content management platform 115 may group documents recently edited, commented, or shared by Ben Dupree.

In another implementation, the cloud-based content management platform 115 may group documents based on a timing of user access. The cloud-based content management platform 115 may group documents in the set of active documents that are likely to be opened together by the user at the same time to similarity (e.g., topicality) or based on past document access history. In an implementation, the cloud-based content management platform 115 may group documents based on a frequency of user access. The cloud-based content management platform 115 may determine frequency of access for each document in the set of active documents. In response to identifying a subset of documents having a particularly high frequency of access apart from the rest of the documents, the cloud-based content management platform 115 may determine the subset of documents as a candidate workspace.

Moreover, the cloud-based content management platform 115 may suggest a title for each candidate workspace for the user. For example, if a candidate workspace is suggested based on a topicality, the cloud-based content management platform 115 may identify the key text or knowledge entity used to group the documents in the candidate workspace as the suggested title (e.g., "2018 Planning"). In another example, if a candidate workspace is suggested based on an attachment source, the cloud-based content management platform 115 may determine a subject of the email or message threads, a name of the chat room or the communication channel as the suggested title of the candidate workspace (e.g., "Project Kick-off" from the subject of the email thread, "Recently attached in [a name of a channel or room]"). In case the cloud-based content management platform 115 suggests a candidate workspace based on an associated user, the cloud-based content management platform 115 may use a name of the associated user as the suggested title (e.g., "From Ben Dupree"). In another case where a suggestion of the candidate workspace is based on a timing of user access, the cloud-based content management platform 115 may use a name of the most frequently accessed document as the suggested title (e.g., "Marketing Proposal Q4").

Once the cloud-based content management platform 115 has determined the candidate workspaces for suggestion, the cloud-based content management platform 115 may rank them based on a number of documents in a respective candidate workspace for suggestion. For example, the cloud-based content management platform 115 may rank a candidate workspace having the highest number of documents as the top or a candidate workspace with the lowest number of documents as the top. The cloud-based content management platform 115 may also consider recency of the documents in a respective candidate workspace for suggestion. For example, the cloud-based content management platform 115 may determine how recently the documents in the respective candidate workspace have been created and/or edited. The cloud-based content management platform 115 may rank candidate workspaces based on a number of documents recently created and/or edited. Thus, the cloud-based content management platform 115 may rank the highest a candidate workspace having the greatest number of documents that has been recently created/edited.

Moreover, the cloud-based content management platform 115 may consider relatedness amongst the documents in the respective candidate workspace based on the similarity measures. Accordingly, the higher the similarity measure is for a candidate workspace, the higher the rank is. In an implementation, the cloud-based content management platform 115 may further consider recency and/or frequency of the user interaction with the documents in the respective candidate workspace. The cloud-based content management platform 115 may predict based on the recency and/or frequency of the user interaction which documents the user is likely to access in the near future. The cloud-based content management platform 115 may assign a rank to candidate workspaces according to a number of documents associated with the candidate workspaces that the user is likely to access in the near future. Accordingly, the cloud-based content management platform 115 may incorporate such prediction in ranking the candidate workspaces for suggestion. After the ranking, the cloud-based content management platform 115 may select a subset of workspaces for suggesting a new workspace from the candidate workspaces based on the rankings. For example, the cloud-based content management platform 115 may select a top three highly ranked candidate workspaces for the suggestion, from the candidate of workspaces.

Figure 4B:
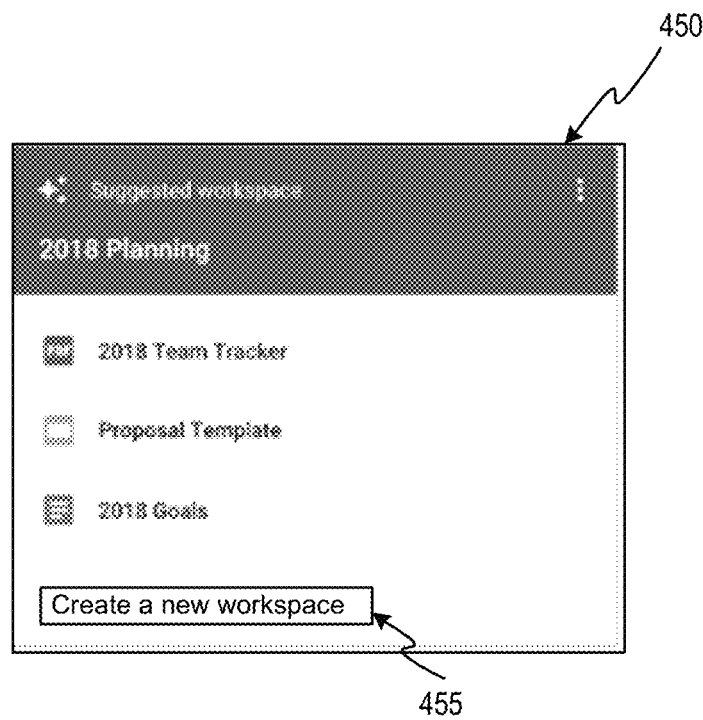
FIG. 4B illustrates an example user interface of a notification of a new workspace for display on the user interface.

At block 404, the cloud-based content management platform 115 may provide a notification of the one or more new workspaces for suggestion on the home screen GUI 200 for a user input indicating approval to create a new workspace as illustrated in FIG. 2A (as the notification tab for suggested workspaces 223) and FIG. 4B. FIG. 4B depicts an example user interface of a notification of a new workspace 450 for display on the user interface 124. The cloud-based content management platform 115 may provide the notification of a new workspace 450 as a visual representation in the second area 220, or a pop-up window on the user interface 124 in response to receiving a user input on the notification tab for suggested workspaces 223. The notification of a new workspace 450 may include a suggested title of the respective workspace and a list of documents grouped for the respective workspace. The notification of a new workspace 450 may further include a button or link with a text "Create a new workspace" 455 to enable the user to permanently add the new workspace to the second area 220. The cloud-based content management platform 115 may further create a new workspace data object or database entry with associations of documents grouped in the workspace.

At block 406, the cloud-based content management platform 115 may receive a user input indicating approval to create a new workspace from a particular workspace being suggested. For example, the cloud-based content management platform 115 may receive a selection (e.g., via the "Create a new workspace" button or link 455) on one of the notifications of workspaces suggested to the user. Responsive to the user input indicating approval to create a particular workspace from the new workspaces for suggestion, the cloud-based content management platform 115 may add a visual representation of the particular workspace 225 as a new workspace to the second area 220.

Figure 5:
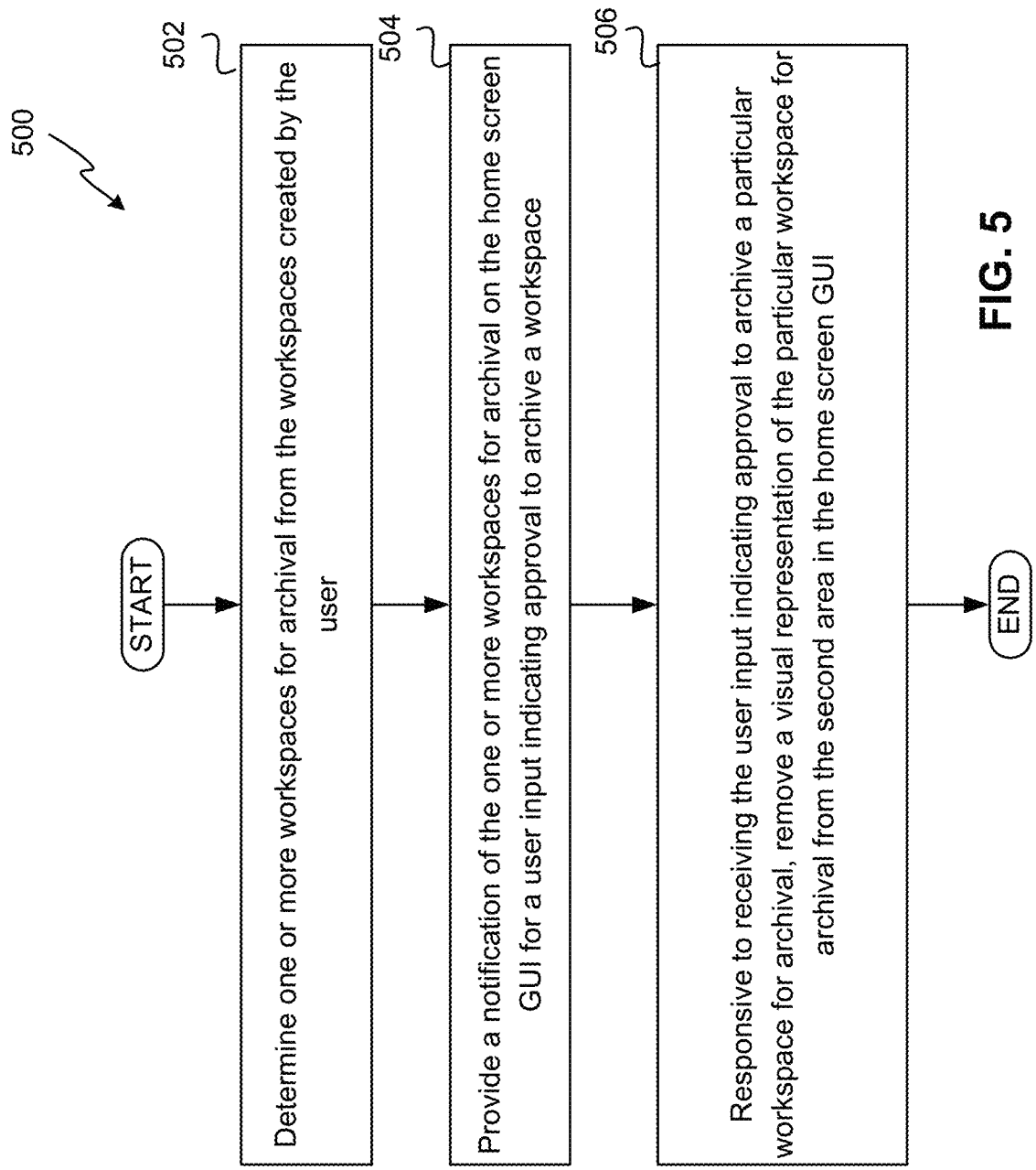
FIG. 5 depicts a flow diagram of aspects of a method for notifying the user of workspaces for archival, in accordance with one implementation of the disclosure.

FIG. 5 depicts a flow diagram of aspects of a method 500 for notifying the user of workspaces for archival, in accordance with one implementation of the disclosure.

The method 500 may be performed by the cloud-based content management platform 115 of FIG. 1 to provide a notification on the user interface 124. In another implementation, the method 500 may be performed by a client application executed by one or more processing devices of the user device 120. In some implementations, the method 500 may be performed when a number of workspaces created by the user has reached or is close to reaching the maximum number of visual representations of workspaces 225 that can be provided in the second area 220 of the home screen GUI 200. In an implementation where the workspaces created by the user also include archived workspaces, it is the number of unarchived workspaces or active workspaces that counts towards the maximum number of visual representations of workspaces 225.

At block 502, the cloud-based content management platform 115 may determine workspaces for archival from the workspaces created by the user. In an implementation, the cloud-based content management platform 115 may determine a set of candidate workspaces for archival including the workspaces created by the user but excluding any workspaces archived. That is, the cloud-based content management platform 115 may recommend from the workspaces, whose visual representation is provided in the second area 220, a workspace to be archived. For each workspace in the set, the cloud-based content management platform 115 may determine a number of documents in a respective candidate workspace that overlap with documents in the set of active documents. Then, in response to determining that the number of overlapping documents does not exceed a predetermined threshold, the cloud-based content management platform 115 may identify the respective candidate workspace for archival as the workspace for archival. For example, for any candidate workspaces for archival that has less than three documents overlapping with documents in the set of active documents, the cloud-based content management platform 115 may recommend archival.

At block 504, the cloud-based content management platform 115 may provide a notification of the workspaces for archival on the home screen GUI 200 for a user input indicating approval to archive a workspace. The cloud-based content management platform 115 may include in the notification a title of the workspace or a visual representation of the workspace. The notification of a workspace for archival may be presented in a similar manner as with the notification tab for suggested workspaces 223, as a separate tab with an indication of a number of archival suggestions. The cloud-based content management platform 115 may highlight a visual representation corresponding to the suggested workspace for archival in the second area 220 of the home screen GUI 200 in a similar manner as with the notification of a new workspace 450.

At block 506, the cloud-based content management platform 115 may receive a user input indicating approval to archive a particular workspace for archival. For example, the cloud-based content management platform 115 may receive a selection of one of the notifications of workspaces suggested to the user. Responsive to the user input indicating approval to archive the selected workspace, the cloud-based content management platform 115 may update the home screen GUI 200 to show that a visual representation of the particular workspace 225 has been removed from the second area 220 in the home screen GUI 200. The visual representation of the particular workspace 225 may be further moved from the second area 220 to the third area 230, if the third area 230 is provided in the home screen GUI 200. In an implementation, the cloud-based content management platform 115 may update a status of the particular workspace 225 from the default active state to an archived state by changing a Boolean value or tag associated with the particular workspace 225.

In some implementations, the cloud-based content management platform 115 may recommend unarchival of archived workspaces. The cloud-based content management platform 115 may determine that a number of documents overlap in each archived workspace with documents in the set of active documents. In response to determining, that the number of documents for an archived workspace exceeds a predetermined threshold (e.g., if there are more than five documents in an archived workspace that overlap with documents in the set of active documents), the cloud-based content management platform 115 may provide a notification on the home screen GUI 200 to recommend unarchival of the archived workspace. Responsive to a user's approval to unarchive the archived workspace, a visual representation of the archived workspace may be moved back to the second area 220. The cloud-based content management platform 115 may change the status of the corresponding workspace from archived to active. The cloud-based content management platform 115 may recommend the unarchival when the number of workspaces 225 falls below a predetermined threshold or on a periodic basis. In some other implementations, the cloud-based content management platform 115 may similarly recommend archival or unarchival of documents or folders.

Figure 6:
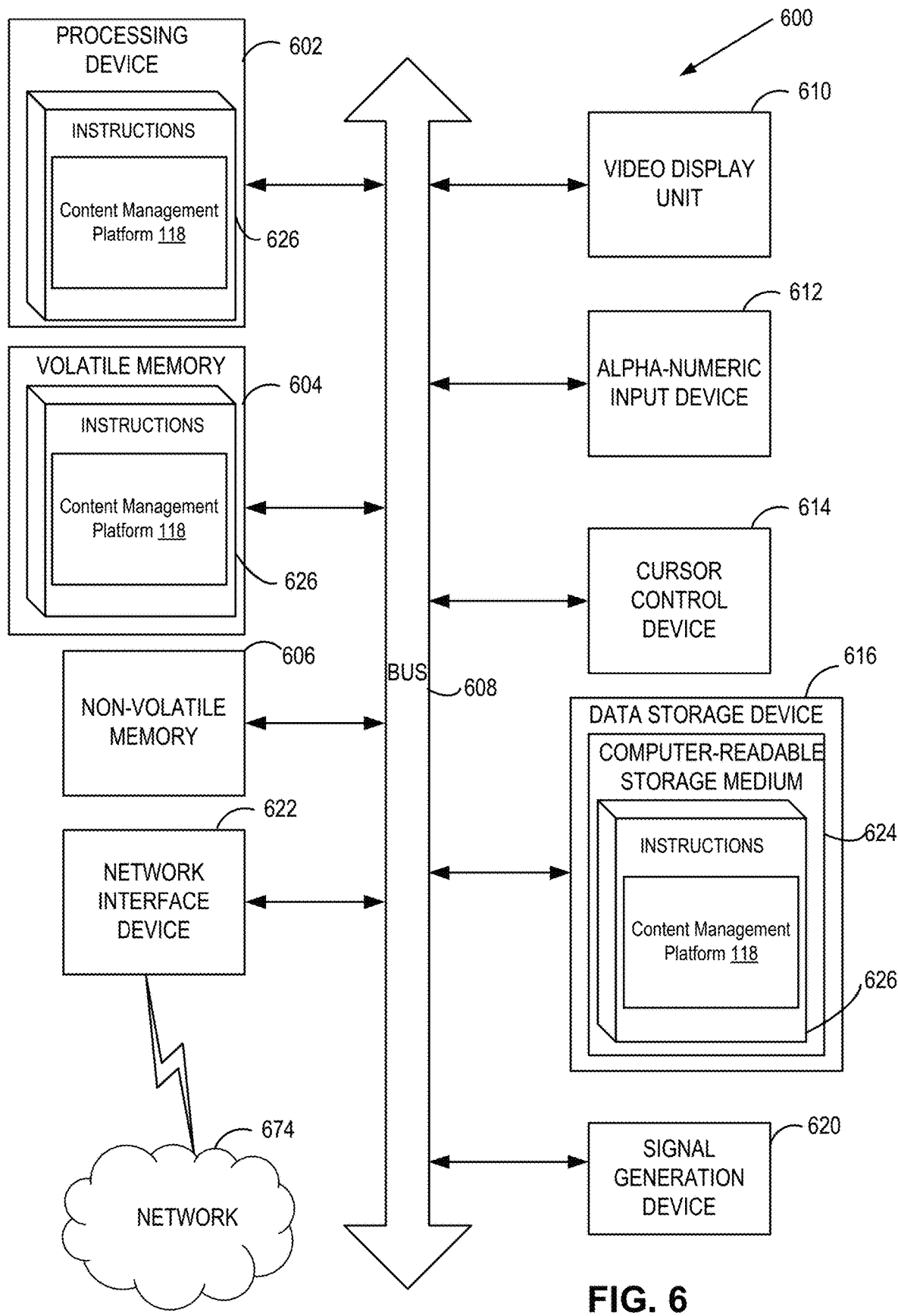
FIG. 6 depicts a block diagram of an example computing system operating in accordance with one or more aspects of the present disclosure.

FIG. 6 depicts a block diagram of an example computing system operating in accordance with one or more aspects of the present disclosure. In various illustrative examples, computer system 600 may correspond to any of the computing devices within system architecture 100 of FIG. 1. In one implementation, the computer system 600 may be a server 112. In another implementation, the computer system 600 may be each of the user devices 120A-120Z.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alpha-numeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions implementing the cloud-based content management platform 118 of FIG. 1 for implementing the methods described herein.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

In the above description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "displaying", "ranking", "identifying", "determining", "notifying", "predicting", "suggesting", "providing", "presenting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus can be constructed for the intended purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

What is claimed is:

1. A method of providing a workspace graphical user interface (GUI) for a user of a cloud-based content management platform, the method comprising:
   identifying documents associated with a user account of the user on the cloud-based content management platform, wherein the documents are automatically selected from a plurality of documents stored on the cloud-based content management platform in association with the user account of the user, based on a type of previous user activity incurred to access the plurality of documents stored on the cloud-based content management platform;
   identifying workspaces associated with the user account of the user on the cloud-based content management platform, wherein each of the workspaces was previously created by the user and includes a set of documents added to a respective workspace by the user and stored on the cloud-based content management platform in association with the user account of the user;
   providing the workspace GUI for the user via the cloud-based content management platform, wherein the workspace GUI concurrently presents:
      visual representations of the documents automatically selected based on the type of the previous user activity incurred to access the plurality of documents stored on the cloud-based content management platform; and
      visual representations of the workspaces created by the user, a visual representation of each workspace including the set of documents previously added to the respective workspace by the user, wherein the documents automatically selected based on the type of the previous user activity incurred to access the plurality of documents include documents other than documents included in the workspaces created by the user;
   receiving, via the workspace GUI, a user input with respect to a corresponding document of the documents, the user input indicating a request to add the corresponding document to a particular workspace of the workspaces created by the user;
   modifying a visual representation of the particular workspace to add the corresponding document to the set of documents of the particular workspace; and
   allowing the user to perform an action pertaining to content of the corresponding document in the workspace GUI without opening a document editing application associated with the corresponding document.

2. The method of claim 1, wherein the action comprises viewing or responding to a comment or editing the content of the corresponding document.

3. The method of claim 1, wherein the workspace GUI comprises a GUI element that is selectable by the user to add a new workspace to the workspaces associated with the user account of the user.

4. The method of claim 1, wherein identifying the documents associated with the user account of the user comprises:
   for each document of the plurality of documents associated with the user account of the user, determining a level of engagement of the user with a respective document during a last predetermined time period based on at least one of a length of time the user has accessed the respective document or whether or not the user has edited, added a comment to, or shared the respective document; and
   determining a set of active documents including one or more documents that have the level of engagement exceeding a predetermined threshold level.

5. The method of claim 4, wherein providing the workspace GUI for the user further comprises:
   determining one or more new workspaces for suggestion to the user, each new workspace for suggestion including a set of documents identified from the set of active documents;
   providing a notification of the one or more new workspaces for suggestion on the workspace GUI; and
   responsive to receiving, via the workspace GUI, a user input indicating approval to create a particular workspace from the one or more new workspaces provided for suggestion, adding a visual representation of the particular workspace to the workspace GUI.

6. The method of claim 5, wherein determining the one or more new workspaces for suggestion to the user comprises:
   grouping documents from the set of active documents into a plurality of candidate workspaces for suggestion based on similarity amongst the documents in at least one of topicality, attachment source, associated users, or timing and frequency of user access;
   ranking the plurality of candidate workspaces for suggestion based on at least one of a number of documents in a respective candidate workspace for suggestion, recency of the documents in a respective candidate workspace for suggestion, relatedness amongst the documents in a respective candidate workspace for suggestion, or recency and frequency of user interaction with the documents in a respective candidate workspace for suggestion; and selecting the one or more new workspaces for suggestion from the plurality of candidate workspaces based on the rankings.

7. The method of claim 1, wherein providing the workspace GUI for the user further comprises:

determining one or more workspaces for archival from the workspaces created by the user;

providing a notification of the one or more workspaces for archival on the workspace GUI for a user input indicating approval to archive a workspace; and responsive to receiving, via the workspace GUI, the user input indicating approval to archive a particular workspace for archival, removing a visual representation of the particular workspace for archival from the workspace GUI.

8. The method of claim 7, wherein determining the one or more workspaces for archival further comprises:

determining a set of candidate workspaces for archival including the workspaces created by the user but excluding any workspaces archived; and for each workspace in the set of candidate workspaces for archival:

determining a number of documents in a respective candidate workspace for archival that overlap with documents in the set of active documents; and identifying the respective candidate workspace for archival as the workspace for archival responsive to determining that the number of documents does not exceed a predetermined threshold.

9. A system to provide a workspace graphical user interface (GUI) for a user of a cloud-based content management platform, the system comprising:

a memory device; and a processing device, coupled to the memory device, to perform operations comprising:

identifying documents associated with a user account of the user on the cloud-based content management platform, wherein the documents are automatically selected from a plurality of documents stored on the cloud-based content management platform in association with the user account of the user, based on a type of previous user activity incurred to access the plurality of documents stored on the cloud-based content management platform;

identifying workspaces associated with the user account of the user on the cloud-based content management platform, wherein each of the workspaces was previously created by the user and includes a set of documents added to a respective workspace by the user and stored on the cloud-based content management platform in association with the user account of the user;

providing the workspace GUI for the user via the cloud-based content management platform, wherein the workspace GUI concurrently presents:

visual representations of the documents automatically selected based on the type of the previous user activity incurred to access the plurality of documents stored on the cloud-based content management platform; and visual representations of the workspaces created by the user, a visual representation of each workspace including the set of documents previously added to the respective workspace by the user, wherein the documents automatically selected based on the type of the previous user activity incurred to access the plurality of documents include documents other than documents included in the workspaces created by the user;

receiving, via the workspace GUI, a user input with respect to a corresponding document of the documents, the user input indicating a request to add the corresponding document to a particular workspace of the workspaces created by the user;

modifying a visual representation of the particular workspace to add the corresponding document to the set of documents of the particular workspace; and allowing the user to perform an action pertaining to content of the corresponding document in the workspace GUI without opening a document editing application associated with the corresponding document.

10. The system of claim 9, wherein the action comprises viewing or responding to a comment or editing the content of the corresponding document.

11. The system of claim 9, wherein the workspace GUI comprises a GUI element that is selectable by the user to add a new workspace to the workspaces associated with the user account of the user.

12. The system of claim 9, wherein identifying the documents associated with the user account of the user comprises:

for each document of the plurality of documents associated with the user account of the user, determining a level of engagement of the user with a respective document during a last predetermined time period based on at least one of a length of time the user has accessed the respective document or whether or not the user has edited, added a comment to, or shared the respective document; and determining a set of active documents including one or more documents that have the level of engagement exceeding a predetermined threshold level.

13. The system of claim 12, wherein providing the workspace GUI for the user further comprises:

determining one or more new workspaces for suggestion to the user, each new workspace for suggestion including a set of documents identified from the set of active documents;

providing a notification of the one or more new workspaces for suggestion on the workspace GUI; and responsive to receiving, via the workspace GUI, a user input indicating approval to create a particular workspace from the one or more new workspaces provided for suggestion, adding a visual representation of the particular workspace to the workspace GUI.

14. The system of claim 13, wherein determining the one or more new workspaces for suggestion to the user comprises:

grouping documents from the set of active documents into a plurality of candidate workspaces for suggestion based on similarity amongst the documents in at least one of topicality, attachment source, associated users, or timing and frequency of user access;

ranking the plurality of candidate workspaces for suggestion based on at least one of a number of documents in a respective candidate workspace for suggestion, recency of the documents in a respective candidate workspace for suggestion, relatedness amongst the documents in a respective candidate workspace for suggestion, or recency and frequency of user interaction with the documents in a respective candidate workspace for suggestion; and selecting the one or more new workspaces for suggestion from the plurality of candidate workspaces based on the rankings.

15. The system of claim 9, wherein providing the workspace GUI for the user further comprises:
determining one or more workspaces for archival from the workspaces created by the user;
providing a notification of the one or more workspaces for archival on the workspace GUI for a user input indicating approval to archive a workspace; and
responsive to receiving, via the workspace GUI, the user input indicating approval to archive a particular workspace for archival, removing a visual representation of the particular workspace for archival from the workspace GUI.

16. The system of claim 15, wherein determining the one or more workspaces for archival further comprises:
determining a set of candidate workspaces for archival including the workspaces created by the user but excluding any workspaces archived; and
for each workspace in the set of candidate workspaces for archival:
determining a number of documents in a respective candidate workspace for archival that overlap with documents in the set of active documents; and
identifying the respective candidate workspace for archival as the workspace for archival responsive to determining that the number of documents does not exceed a predetermined threshold.

17. A non-transitory computer readable medium storing instructions that, when executed, cause a processing device to perform operations to provide a workspace graphical user interface (GUI) for a user of a cloud-based content management platform, the operations comprising:
identifying documents associated with a user account of the user on the cloud-based content management platform, wherein the documents are automatically selected from a plurality of documents stored on the cloud-based content management platform in association with the user account of the user, based on a type of previous user activity incurred to access the plurality of documents stored on the cloud-based content management platform;
identifying workspaces associated with the user account of the user on the cloud-based content management platform, wherein each of the workspaces was previously created by the user and includes a set of documents added to a respective workspace by the user and stored on the cloud-based content management platform in association with the user account of the user;
providing the workspace GUI for the user via the cloud-based content management platform, wherein the workspace GUI concurrently presents:
visual representations of the documents automatically selected based on the type of the previous user activity incurred to access the plurality of documents stored on the cloud-based content management platform; and
visual representations of the workspaces created by the user, a visual representation of each workspace including the set of documents previously added to the respective workspace by the user, wherein the documents automatically selected based on the type of the previous user activity incurred to access from the plurality of documents include documents other than documents included in the workspaces created by the user;

receiving, via the workspace GUI, a user input with respect to a corresponding document of the documents, the user input indicating a request to add the corresponding document to a particular workspace of the workspaces created by the user;
modifying a visual representation of the particular workspace to add the corresponding document to the set of documents of the particular workspace; and
allowing the user to perform an action pertaining to content of the corresponding document in the workspace GUI without opening a document editing application associated with the corresponding document.

18. The non-transitory computer readable medium of claim 17, wherein the action comprises viewing or responding to a comment or editing the content of the corresponding document.

19. The non-transitory computer readable medium of claim 17, wherein the workspace GUI comprises a GUI element that is selectable by the user to add a new workspace to the workspaces associated with the user account of the user.

20. The non-transitory computer readable medium of claim 17, wherein identifying the documents associated with the user account of the user comprises:
for each document of the plurality of documents associated with the user account of the user, determining a level of engagement of the user with a respective document during a last predetermined time period based on at least one of a length of time the user has accessed the respective document or whether or not the user has edited, added a comment to, or shared the respective document; and
determining a set of active documents including one or more documents that have the level of engagement exceeding a predetermined threshold level.

21. The non-transitory computer readable medium of claim 20, wherein providing the workspace GUI for the user further comprises:
determining one or more new workspaces for suggestion to the user, each new workspace for suggestion including a set of documents identified from the set of active documents;
providing a notification of the one or more new workspaces for suggestion on the workspace GUI; and
responsive to receiving, via the workspace GUI, a user input indicating approval to create a particular workspace from the one or more new workspaces provided for suggestion, adding a visual representation of the particular workspace to the workspace GUI.

22. The non-transitory computer readable medium of claim 21, wherein determining the one or more new workspaces for suggestion to the user comprises:
grouping documents from the set of active documents into a plurality of candidate workspaces for suggestion based on similarity amongst the documents in at least one of topicality, attachment source, associated users, or timing and frequency of user access;
ranking the plurality of candidate workspaces for suggestion based on at least one of a number of documents in a respective candidate workspace for suggestion, recency of the documents in a respective candidate workspace for suggestion, relatedness amongst the documents in a respective candidate workspace for suggestion, or recency and frequency of user interaction with the documents in a respective candidate workspace for suggestion; and selecting the one or more new workspaces for suggestion from the plurality of candidate workspaces based on the rankings.

23. The non-transitory computer readable medium of claim 17, wherein providing the workspace GUI for the user further comprises:
   determining one or more workspaces for archival from the workspaces created by the user;
   providing a notification of the one or more workspaces for archival on the workspace GUI for a user input indicating approval to archive a workspace; and
   responsive to receiving, via the workspace GUI, the user input indicating approval to archive a particular workspace for archival, removing a visual representation of the particular workspace for archival from the workspace GUI.

* * * * *